Figure 1:
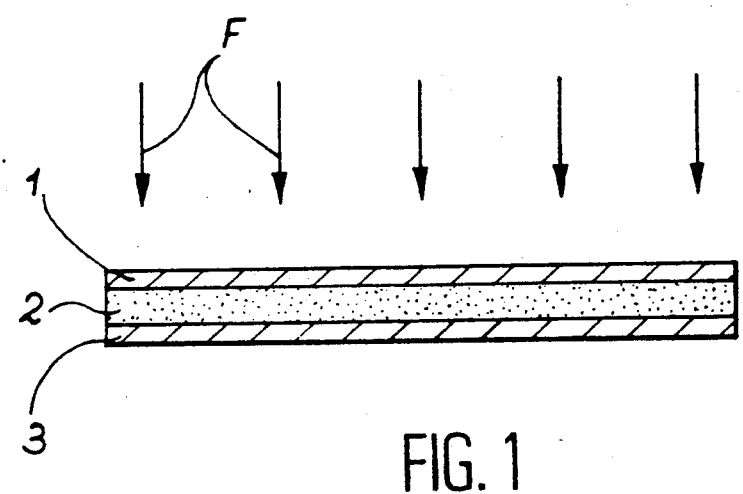

United States Patent
Balanzat et al.

[11] Patent Number: 5,110,683
[45] Date of Patent: May 5, 1992

[54] FILMS HAVING IN THEIR THICKNESS AT LEAST TWO SUPERIMPOSED ZONES, INCLUDING AN INSULATING ZONE AND A CONDUCTIVE ZONE, AND THE PRODUCTION THEREOF BY IRRADIATING A POLYMER FILM BY MEANS OF A BEAM OF HIGH ENERGY IONS

[75] Inventors: Emmanuel Balanzat, Caen; C. Boiziau, Massy; Charles Darnez, Cauderan; Jean-Paul Duraud, Ivry/Seine; Alain LeMoël, Chaville, all of France

[73] Assignee: Commissariat a l'Energie Atomique, Paris, France

[21] Appl. No.: 627,418

[22] Filed: Dec. 14, 1990

Related U.S. Application Data

[62] Division of Ser. No. 218,287, filed as PCT/FR87/00380, Oct. 6, 1987, Pat. No. 4,983,460.

[30] Foreign Application Priority Data

Oct. 10, 1986 [FR] France .................. 86 14111

[51] Int. Cl.$^5$ .......................................... B32B 27/00
[52] U.S. Cl. ............................ 428/421; 428/422; 428/424.7; 428/458; 428/461; 428/474.7; 428/473.5; 428/483; 428/447
[58] Field of Search ............ 428/421, 422, 424.7, 428/458, 461, 474.7, 473.5, 483, 447, 522; 427/407.1, 409, 410, 412.1

[56] References Cited

U.S. PATENT DOCUMENTS

| 4,199,650 | 4/1980 | Mirtich | 428/421 |
| 4,677,017 | 6/1987 | DeAntonis et al. | 428/421 |
| 4,743,493 | 5/1988 | Sioshanji et al. | 428/421 |

FOREIGN PATENT DOCUMENTS

| 161232 | 7/1989 | Fed. Rep. of Germany . |
| 2071673 | 9/1981 | United Kingdom . |

Primary Examiner—E. Rollins Buffalow
Attorney, Agent, or Firm—Oblon, Spivak, McClelland, Maier & Neustadt

[57] ABSTRACT

The invention relates to the production of films having in their thickness at least two superimposed zones, including a semimetallic zone and an electrically insulating zone, by irradiating a polymer film by means of a high energy ion beam.

It is possible by this process to produce semimetal (1)/insulant (2)/semimetal (3) structures by irradiating the polymer under vacuum by means of light ions or with a limited stopping power having an energy of at least 1 MeV/amu. It is also possible to obtain insulant (4)/semimetal (5)/insulant (6) structures by irradiating, in a confined atmosphere, the polymer by means of heavy ions or ions having a high energy loss with an energy of at least 1 MeV/amu.

By irradiating only certain zones of the film, it is thus possible to form embedded or surface-positioned electrical connections.

5 Claims, 1 Drawing Sheet

FILMS HAVING IN THEIR THICKNESS AT LEAST TWO SUPERIMPOSED ZONES, INCLUDING AN INSULATING ZONE AND A CONDUCTIVE ZONE, AND THE PRODUCTION THEREOF BY IRRADIATING A POLYMER FILM BY MEANS OF A BEAM OF HIGH ENERGY IONS

This is a continuation division of application Ser. No. 07/218,287, filed as PCT/FR87/00380, Oct. 6, 1987, now U.S. Pat. No. 4,983,460.

DESCRIPTION

The present invention relates to a process for the production of films having in their thickness at least two superimposed zones, including a zone with a semimetallic character and a zone with an electrical insulation character from organic polymer films, which are subjected to irradiation by means of high energy ion beams.

The structures obtained by this process have interesting electrical and/or optical properties. This process can also be advantageously used in widely varying fields, e.g. in microelectronics, optoelectronics, integrated optics, non-linear optics, telecommunications and in systems for checking optical informations, as well as for producing flat screens. It is more particularly applicable to the production of embedded or surface-positioned electrical interconnections.

The irradiation of organic materials by means of high energy ion beams is a known method, which has in particular been described by T. VENKATESAN et al in J. Appl. Phys. 56, 10, 15.11.1984, pp. 2778 to 2787 to J. DAVENAS et in Annales de Physique, supplement to colloquy no. 1, vol. 11, February 1986, pp. 107 to 112.

Thus, the article of T. VANKATESAN et al studies the influence of irradiation by argon ions on the structure and electrical properties of 3,4,9,10-perylene tetracarboxylic dianhydride and nickel phthalocyanine films. The article states that the irradiation by high energy ions lead to the destruction of the molecular structure by braking certain bonds and the loss of certain elements entering into the constitution of the film, so that there is a carbon enrichment of the film and an increase in its electrical conductivity. The article by J. DAVENAS et al studies the modification of the surface properties of organic polymer films exposed to irradiation by ion beams with an energy of 500 KeV. In this case, there is one again chemical bond breakage with the emission of a hydrogen atom, so that the electrical conductivity of the polymer is improved.

However, up to now, irradiation by means of high energy ion beams has not made it possible to form in the thickness of a film structures having three superimposed alternating insulating/semimetal layers.

The present invention specifically relates to a process making it possible to produce such structures in an organic polymer film.

The inventive process for forming in the thickness of a film a structure having at least two superimposed layers constituted by an insulating layer and a semimetallic layer is characterized in that at least certain surface zones of an electrically insulating organic polymer film undergo irradiation by means of a beam of high energy ions with an adequate energy for the ions to traverse the polymer film.

Figure 2:
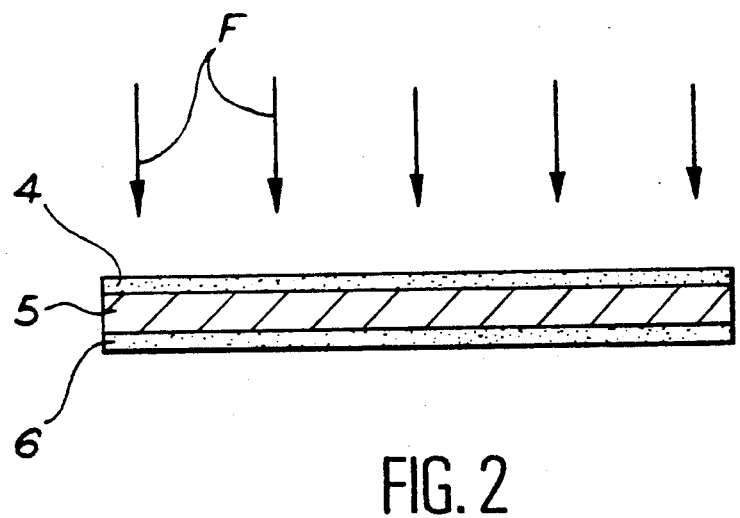

A better understanding of the invention and many of the attendant advantages thereof will be readily obtained as the same becomes better understood by reference to the following detailed description when considered in connection with the accompanying drawings, wherein:

FIG. 1 shows a vertical section of a film embodiment of the present invention subjected to ion irradiation, which film has a semi-metallic/insulant/semi-metallic structure; and FIG. 2 shows a vertical section of a film embodiment of the invention subjected to ion irradiation, which film has an insulant/semi-metallic/insulant structure.

Preferably, the energy of the ions is at least 1 MeV/amu (atomic mass unit).

According to the invention, the use of ions with an energy of at least 1 MeV/amu makes it possible to obtain a disturbance and a modification of the polymer film by using electronic interactions between the ions which pass through the polymer film and the chains of said polymer.

Thus, a high energy heavy ion (whereof the energy is above 1 MeV per nucleon) produces in the material through which it passes a linear trace corresponding to an intense disturbance of the material. The diameter of said latent trace can be between 1 and 100 nm. In a polymer, this disturbance leads to structural modifications of the intermolecular and intramolecular architecture of the polymer. It more particularly leads to the formation of free macro radicals and, for high fluxes, to the loss of identity of the polymer by deterioration of the skeleton. The nature and density of these transformations are dependent on the irradiated polymer, the ions used, their primary energy and their energy loss in the polymer film. This energy loss is in particular dependent on the thickness of the irradiated polymer film, because the energy loss evolves along the path of the ion to a varying extent as a function of the nature and the primary energy of the ion. The nature and the density of the transformations produced in the polymer are also a function of the radiation flux and the atmosphere in which said radiation is performed.

There is also an appropriate choice of the ions used, their primary energy, the radiation flux and the radiation atmosphere, which makes it possible to control the nature and density of the transformations produced in the organic polymer film and to orient the same either towards obtaining a structure formed from three superimposed layers constituted by a first semimetallic layer, a second insulating layer and a third semimetallic layer, or towards obtaining a film formed form three superimposed layers constituted by a first electrically insulating layer, a second semimetallic layer and a third electrically insulating layer.

Thus, according to a first embodiment of the inventive process adapted to the formation in the thickness of the film, at locations corresponding to the irradiated zones, of a structure constituted by three superimposed zones, which are respectively a first semimetallic layer, a second electrically insulating layer and a third semimetallic layer, irradiation taking place under a vacuum and light ions or ions having a low stopping power are used with irradiation conditions such that only the opposite surfaces of the film are modified and which correspond to the irradiated zones by giving to said surfaces a semimetallic character.

In this case, the ions have an adequate energy to pass through the complete organic polymer film, but their energy loss in the film remains low, so that only the opposite surface layers of the film are modified over a thickness which can range between 0.1 and a few μm.

The latter are depleted in volatile elements such as H and therefore enriched in carbon, which gives them a semimetallic character. The surface layers of the polymer film also undergo a greater modification than the remainder of the film, due to the increased possibility of desorption of the chemical species.

The energy of the incident ions and the fluence of the beam, i.e. the number of ions per cm$^2$, are chosen as a function of the nature of the polymer and the ions used. Thus, when the polymer is polyvinylidene fluoride and the ions are krypton ions, the flux of the beam must be below $10^{12}$ ions·cm$^{-2}$ for an energy of the incident ions of 3800 MeV.

When use is made of oxygen ions with a polyvinylidene fluoride film, it is possible to obtain this alternating semimetal/insulant/semimetal layer structure by using fluxes below $10^{13}$ ions cm$^{-2}$ for an energy of the incident ions of 800 MeV.

When using krypton ions with a polytetrafluoroethylene film, it is possible to obtain a semimetallic/insulant/semimetal structure with fluxes below $10^-$ ions·cm$^{-2}$ for an energy of the incident ions of 3800 MeV.

According to a second embodiment of the inventive process adapted to the formation in the thickness of the film, at the locations corresponding to the irradiated zones, of a structure constituted by three superimposed layers, which are respectively a first electrically insulating layer, a second semimetallic layer and a third electrically insulating layer, irradiation takes place in a confined atmosphere in a tight enclosure and use is made of heavy ions or ions having a high stopping power with irradiation conditions and an energy of the incident ions such that all the thickness of the organic polymer film is modified on the irradiated zones. In this case, generally use is made of high fluxes. In this way, interactions of the ions are obtained with the complete film and during these interactions the polymer loses virtually all its most volatile elements and is transformed into a film having a semimetallic character. However, due to the use of a tight enclosure and a confined atmosphere, the desorbed reactive species can react with one another on the surface layers of the film and consequently reconstitute on said surface layers an electrically insulating polymer.

According to a variant of said second embodiment of the inventive process, it is possible to aid the reconstitution of an insulating layer on the surface layers of the irradiated zones of the film by carrying out the irradiation in a reactive gas atmosphere.

Thus, by reacting desorbed reactive species of the irradiated polymer film with gaseous reagents present in the enclosure, it would be possible to form insulating layers on the surface of the film.

For example, the gaseous reagent can be reconstituted by halogen or hydrohalogen-containing compounds, e.g. chlorine or fluorine, cyano derivatives, boron derivatives, silicon derivatives or nitrogen derivatives. It is also possible to use as the gaseous reagent a monomer which will react with the polymer modified by irradiation whilst forming a copolymer or an alloy of polymers on the surfaces of the film. The monomer used is a polymerizable monomer having at least one ethylene unsaturation.

As non-limitative examples of such monomers, reference can be made to ethylene, tetrafluoroethylene and derivatives thereof, butadiene and its derivatives, styrene and its derivatives, acrylamide and its derivatives, acrylonitrile and ally glycidyl ether, isomers of vinyl pyridine and their derivatives, esters of acrylic and methacrylic acid and in particular hydroxyethyl methacrylate and dimethylamino ethyl methacrylate, N-vinyl pyrrolidone and N-vinyl caprolactone.

According to the invention and as shown hereinbefore, the irradiation conditions are chosen as a function of the ions used, the nature of the organic polymer film and the thickness of said film in order to obtain the desired modification.

The integrated radiation dose Di (in Mrad) corresponding to the energy deposited in the film is related to the electronic stopping power $\Delta E$ (in MeV·mg$^{-1}$·cm$^2$) of the ions in the film and the flux F (in ions·cm$^{-2}$) of the ion beam in the following way:

$$Di = \Delta E \times 1.6 \cdot 10^{-11} F$$

Thus, it is possible to act on the integrated irradiation dose, the flux of the ion beam and the energy of the incident ions in order to obtain an energy loss of the ions in the film making it possible to obtain the desired modifications.

The energy loss is also dependent on the nature of the organic polymer film and its thickness and its parameters must be established in each particular case. They can be determined on the basis of Annales de Physique: F. Hubert, A. Fleury, R. Bimbot and D. Gardes, "Range and Stopping Power Tables for 2.5–100 MeV/nucleon.Heavy Ions in Solids", (1980), vol. 5, published by Masson.

The polymers which can be modified by the inventive process are those which, by interaction with a high energy ion beam, can lead to derivatives having ethylene and/or acetylene unsaturations, e.g. structures of the polydiene type (—CH=CH—CH=CH—), polyallene structures (—CH=C=CH—), polyacetylene and polydiacetylene structures of the type (—C C—CH$_2$—C C—) or structures of the cumulene type (—C=C=C=C—). It is also possible to use straight chain polymers having nitrogen, phosphorus, silicon, sulphur or oxygen.

Examples of polymers usable in the invention are polyolefins and their derivatives, e.g. polyethylene and polypropylene, halogenocarbon polymers, e.g. fluorocarbon polymers, such as polytetrafluoroethylene, polyvinylidene fluoride and polyvinyl fluoride, chlorocarbon polymers such as polyvinylidene chloride and polyvinyl chloride and iodocarbon and bromocarbon polymers, hydrohalogen carbon polymers and their derivatives, copolymers of halogenocarbon and hydrohalogenocarbon monomers, pseudo-halogen polymers, such as cyano and isocyano polymers and their derivatives, e.g. polyacrylonitrile and polydicyanoethylene, polyamides, polyimides, polyesters, polysilanes, polysiloxanes, polysulphones, polyethers and polyphosphazines.

In general, the organic polymer film has a thickness of 0.1 $\mu$m to 1 mm.

The ions which can be used in the invention can be of different types. In particular it is possible to use oxygen, neon, argon, xenon, krypton and uranium ions. In the second embodiment of the process the tendency is to use heavy ions, such as krypton ions.

Irradiation can be carried out at ambient or higher temperatures, e.g. from 20° to 80° C.

Irradiation can also be carried out at low temperature, in particular when the polymers which constitute the film will be more rapidly restructured after modification by the ion beam. Thus, in the case of polyethylene, it may be of interest to carry out irradiation at liquid nitrogen temperature to prevent this restructuring.

Generally, irradiation is performed under vacuum. However, it is also possible to carry out irradiation in other atmospheres, e.g. a neutral gas or air atmosphere, when the possible reactions of the polymer with the oxygen of the air are not prejudicial with regards to the sought modification.

In the second embodiment of the inventive process, the irradiation is also performed in a confined tight enclosure, in order that the desorbed reactive species of the film can react with one another on the surface of the film instead of being dispersed in the enclosure.

In the two embodiments of the inventive process, irradiation is performed by using conventional equipment, e.g. heavy ion accelerators above to produce ion beams with an energy of at least 1 MeV/amu.

In order to obtain incident ions with an energy below that of the ions leaving the accelerator, it is possible to use attenuators or simultaneously irradiate several films arranged in stack form, so that the last films of the stack receive ions of the desired energy.

In general, the films which undergo irradiation are suspended on the path of the ion beam so as to be traversible by the latter without being in contact with a support. In certain cases, they can however be disposed on an appropriate support during irradiation.

When it is only wished to irradiate certain zones of the film, it is possible to use an apparatus making it possible to perform the irradiation of the desired zones only of the film surface. It is also possible to use masks.

This method of irradiating the film in particular makes it possible to produce electrical connections embedded in the film or arranged on the surface thereof.

The invention also relates to a film formed from alternating layers obtained by this process.

According to the first embodiment of the invention, said film has in its thickness a structure successively constituted by a first semimetallic layer, a second electrically insulating layer and a third semimetallic layer and is characterized in that the electrically insulating layer is constituted by an organic polymer and in that the semimetallic layer is constituted by a derivative of said organic polymer.

According to the second embodiment of the invention, said film has in its thickness a structure successively constituted by an electrically insulating layer, a second semimetallic layer and a third electrically insulating layer and is characterized in that the electrically insulating layers are constituted by an organic polymer and in that the semimetallic layer is constituted by a derivative of said organic polymer.

In these two embodiments of the invention, the organic polymer derivative constituting the semimetallic layer can have ethylene and/or acetylene unsaturations and can e.g. have a polyallene structure.

EXAMPLE 1

This example involves the preparation according to the first embodiment of the invention of a semimetal/insulant/semimetal structure from a 25 micrometer thick polyvinylidene fluoride film.

In this example, use is made of an oxygen ion beam and irradiation is performed under the following conditions:

| | |
|---|---|
| Pressure | $1.35 \cdot 10^{-4}$ Pa ($10^{-6}$ Torr), |
| Temperature | 30° C., |
| Energy of the incident oxygen ions | 800 MeV, |
| Integrated dose | 4.3 Mrads, |
| Flux | $3.6 \cdot 10^{11}$ ions $\cdot$ cm$^{-2}$, and |
| Ion energy loss | 0.74 MeV $\cdot$ mg$^{-1}$ cm$^2$. |

FIG. 1 shows in vertical section the film obtained after irradiating in accordance with the path of the arrows F. This film comprises a first semimetallic layer 1, a second insulating layer 2 and a third semimetallic layer 3. The film is analyzed by X-photoemission spectroscopy using a monochromatic source AlK $\alpha = 1486.6$ eV.

It is pointed out that the film has on its opposite surface 1 and 3 zones modified by the presence of polyallene. On these surfaces the ratio of the intensity of the characteristic groups of the polyallene, i.e. of the modified polymer to the groups of the unmodified polymer is 50.7%.

The film is also analyzed by electronic paramagnetic resonance and it is found that the core of the film has not been modified.

EXAMPLE 2

As in example 1 a semimetal/insulant/semimetal structure is prepared by irradiating a 25 micrometer thick polyvinyl fluoride film by means of oxygen ions under the following conditions:

| | |
|---|---|
| Pressure | $1.35 \cdot 10^{-4}$ Pa ($10^{-6}$ Torr), |
| Temperature | 30° C., |
| Energy of the oxygen ions | 60 MeV, |
| Integrated dose | 18.4 Mrads, |
| Flux | $3.6 \cdot 10^{11}$ ions $\cdot$ cm$^{-2}$, and |
| Ion energy loss | 3.16 MeV $\cdot$ mg$^{-1}$ $\cdot$ cm$^2$. |

The film is analyzed as in example 1 by X-photoemission spectroscopy and by electronic paramagnetic resonance. It is found that the intensity ratio, i.e. the ratio corresponding to the modified polymer is 65%. Thus, the modification is greater than in example 1. However, the core of the film is substantially unchanged and only a few radicals resulting from splitting or cleaving of main chains are detected.

Thus, the use of less high energy ions having a greater energy loss, but a higher integrated dose increases the surface modification rate of the polymer film without modifying the core.

EXAMPLE 3

In this example, from a 50 micrometer thick polyvinylidene fluoride sheet is formed a semimetal/insulant/semimetal structure using the first embodiment of the inventive process. Irradiation is carried out by means of an oxygen ion beam under the following conditions:

| | |
|---|---|
| Pressure | $1.35 \cdot 10^{-4}$ Pa ($10^{-6}$ Torr), |
| Temperature | below 40° C., |
| Energy of the oxygen ions | 800 MeV, |
| Integrated dose | 28 Mrads, |
| Flux | $2.4 \cdot 10^{12}$ ions $\cdot$ cm$^{-2}$, and |
| Ion energy loss | 0.74 MeV $\cdot$ mg$^{-1}$ $\cdot$ cm$^2$. |

Analysis of the film by X-photoemission spectroscopy and by electronic paramagnetic resonance shows that the intensity ratio corresponding to the modified zone is 62% and that the core zone of the film is substantially unchanged.

EXAMPLE 4

The first embodiment of the inventive process is used to obtain from the polyvinylidene fluoride sheet of example 3 a semimetal/insulant/semimetal structure. Irradiation is carried out by means of an oxygen ion beam under the following conditions:

| | |
|---|---|
| Pressure | $1.35 \cdot 10^{-4}$ Pa ($10^{-6}$ Torr), |
| Temperature | below 40° C., |
| Energy of the oxygen ions | 60 MeV, |
| Integrated dose | 127 Mrads, |
| Flux | $2.4 \cdot 10^{12}$ ions $\cdot$ cm$^{-2}$, and |
| Ion energy loss | 3.16 MeV $\cdot$ mg$^{-1} \cdot$ cm$^2$. |

The film is analyzed by X-photoemission spectroscopy and electronic paramagnetic resonance. It is found that the intensity ratio corresponding to the modified zone is 79% and that the core zone of the film is characterized of the original polymer which has undergone a few main chain splits.

EXAMPLE 5

The first embodiment of the inventive process is used to obtain from a 25 micrometer thick polyvinylidene fluoride sheet a semimetal/insulant/semimetal structure. Irradiation is carried out by means of a krypton ion beam under the following conditions:

| | |
|---|---|
| Pressure | $1.35 \cdot 10^{-4}$ Pa ($10^{-6}$ Torr), |
| Temperature | <60° C., |
| Energy of krypton ions | 3800 MeV, |
| Integrated dose | 39.6 Mrads, |
| Flux | $1.35 \cdot 10^{11}$ ions $\cdot$ cm$^{-2}$, and |
| Ion energy loss | 17.5 MeV $\cdot$ mg$^{-1} \cdot$ cm$^2$. |

The film is analyzed by X-photoemission spectroscopy and electronic paramagnetic resonance. It is found that the intensity ratio corresponding to the modified zone is 33.4% and that the core zone of the film is substantially unchanged.

EXAMPLE 6

This example makes use of the second embodiment of the inventive process for producing an insulant-/semimetal/insulant structure form the polyvinylidenefluoride sheet of example 5. Irradiation is carried out by means of krypton ions under the following conditions:

| | |
|---|---|
| Pressure | $1.35 \cdot 10^{-4}$ Pa ($10^{-6}$ Torr), |
| Temperature | <60° C., |
| Energy of krypton ions | 110 MeV, |
| Integrated dose | 81.4 Mrads, |
| Flux | $1.35 \cdot 10^{11}$ ions $\cdot$ cm$^{-2}$, and |
| Ion energy loss | 52 MeV $\cdot$ mg$^{-1} \cdot$ cm$^2$. |

FIG. 2 shows in vertical section the film obtained after irradiation in accordance with the path of the arrows F. This film comprises a first insulating layer 4, a second semimetallic layer 5 and a third insulating layer 6.

This film is analyzed by X-photoemission spectroscopy and by electronic paramagnetic resonance. It is found that the surface layers 4 and 6 of the film are unchanged, because the intensity ratio corresponding to the modified zone is only 4.8%. However, analysis by electronic paramagnetic resonance shows that the film core 5 is constituted by conductive polyenyl groups.

EXAMPLE 7

In this example an insulant/semimetal/insulant structure is produced from a 50 micrometer thick polyvinylidene chloride sheet using the second embodiment of the inventive process. Irradiation is carried out by means of krypton ions under the following conditions:

| | |
|---|---|
| Pressure | $1.35 \cdot 10^{-4}$ Pa ($10^{-6}$ Torr), |
| Temperature | <60° C., |
| Energy of the krypton ions | 3800 MeV, |
| Integrated dose | 11.1 Mrads, |
| Flux | $3.80 \cdot 10^{10}$ ions $\cdot$ cm$^{-2}$, and |
| Ion energy loss | 18.2 MeV $\cdot$ mg$^{-1} \cdot$ cm$^2$. |

Analysis of the film by X-photoemission spectroscopy shows that the surface of the film is only slightly modified, because the intensity ratio corresponding to the modified zone is 8.6%. Analysis by electronic paramagnetic resonance shows that the core zone is constituted by conductive polyenyl radicals.

EXAMPLE 8

In this example an insulant/semimetal/insulant structure is prepared from a 50 micrometer thick polyvinylidene chloride film using the second embodiment of the inventive process. Irradiation is carried out by means of krypton ions under the following conditions:

| | |
|---|---|
| Pressure | $1.35 \cdot 10^{-4}$ Pa ($10^{-6}$ Torr), |
| Temperature | <60° C., |
| Energy of krypton ions | 110 MeV, |
| Integrated dose | 22.9 Mrads, |
| Flux | $3.80 \cdot 10^{10}$ ions $\cdot$ cm$^{-2}$, and |
| Ion energy loss | 37.5 MeV $\cdot$ mg$^{-1} \cdot$ cm$^2$. |

Analysis of the film by X-photoemission spectroscopy shows that the surface of the film is only slightly modified, the intensity ratio of the modified zone only being 6.7%. Analysis of the film by electronic paramagnetic resonance shows that the core zone is constituted by conductive polyenyl radicals.

EXAMPLE 9

In this example, in accordance with the first embodiment of the inventive process, a semimetal/insulant-/semimetal structure is prepared from a 50 micrometer thick polytetrafluoroethylene sheet, which is irradiated by krypton ions under the following conditions:

| | |
|---|---|
| Pressure | $1.35 \cdot 10^{-4}$ Pa ($10^{-6}$ Torr), |
| Temperature | <60° C., |
| Energy of krypton ions | 3800 MeV, |
| Integrated dose | 34.9 Mrads, |
| Flux | $1.30 \cdot 10^{11}$ ions $\cdot$ cm$^{-2}$, and |
| Ion energy loss | 17 MeV $\cdot$ mg$^{-1} \cdot$ cm$^2$. |

Analysis of the film by X-photoemission spectroscopy shows that the surface of the film is modified by the creation of polydiene compounds, the intensity ratio on the surface of the modified zone being 16.4%. However, analysis by electronic paramagnetic resonance shows that the core zone is only very slightly disturbed because it only contains a few radicals produced by the breaking of the main chains.

Thus, the inventive process makes it possible to obtain structures which differ as a function of the ions and the irradiation conditions used.

We claim:

1. A film, having in its thickness, a structure constituted successively of an electrically insulating layer, a second semi-metallic layer, and a third electrically insulating layer, said electrically insulating layers being constituted of an organic polymer and the semi-metallic layer being constituted of a derivative of said organic polymer and the structure of said film being formed by subjecting said film in a confined atmosphere in a tight enclosure to ion radiation which has sufficient energy to allow the ions to pass completely through the polymer film.

2. The film of claim 1, wherein said organic polymer is selected from the group consisting of polyolefins and their derivatives, fluorine polymers and their derivatives, chlorine polymers and their derivatives, fluorochlorine polymers and their derivative, hydrohalogen polymers and their derivatives, pseudohalogen polymers and their derivatives, polyamides, polyimides, polyesters, polyacrylonitrile and its derivatives, polydicyanoethylene and its derivatives, polysilanes, polysiloxanes, polysulfones, polyethers and polyphosphazines.

3. The film of claim 1, wherein said organic polymer is polyvinylidene fluoride, polyvinylidene chloride or polytetrafluoroethylene.

4. The film of claim 1, wherein the derivative of the organic polymer which constitutes the semi-metallic layer has a polyallene structure.

5. The film of claim 1, wherein said derivative of said organic polymer is said organic polymer having ethylenic and/or acetylenic unsaturation introduced therein.

* * * * *